United States Patent
McHugh et al.

(10) Patent No.: US 8,715,763 B2
(45) Date of Patent: *May 6, 2014

(54) FRUIT AND VEGETABLE FILMS AND USES THEREOF

(75) Inventors: Tara H. McHugh, El Cerrito, CA (US); Matthew D. de Bord, Manteca, CA (US); Carl W. Olsen, Davis, CA (US)

(73) Assignee: The United States of America as Represented by the Secretary of the Department of Agriculture, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/284,496

(22) Filed: Oct. 28, 2011

(65) Prior Publication Data

US 2012/0258206 A1 Oct. 11, 2012

Related U.S. Application Data

(63) Continuation of application No. 10/937,183, filed on Sep. 8, 2004, now Pat. No. 8,048,466.

(51) Int. Cl.
*A23L 1/052* (2006.01)

(52) U.S. Cl.
USPC ........... 426/575; 426/138; 426/573; 426/576; 426/577; 426/578; 426/512; 426/89; 428/35.2; 428/34.8; 428/35.6; 428/411.1; 428/532; 428/533

(58) Field of Classification Search
USPC ................. 426/138, 573–578, 89, 512, 656; 428/35.2, 34.8, 35.6, 411.1, 532, 533
See application file for complete search history.

(56) References Cited

U.S. PATENT DOCUMENTS

| | | | |
|---|---|---|---|
| 4,076,846 A | 2/1978 | Nakatsuka et al. | |
| 4,205,093 A | 5/1980 | Blake | |
| 4,436,759 A | 3/1984 | Trilling et al. | |
| 4,562,020 A * | 12/1985 | Hijiya et al. | 264/39 |
| 4,784,864 A | 11/1988 | Ikeda | |
| 4,840,271 A | 6/1989 | Garwood | |
| 5,084,296 A | 1/1992 | Lugay et al. | |
| 5,110,609 A | 5/1992 | Lewis et al. | |
| 5,264,238 A | 11/1993 | Taga et al. | |
| 5,368,873 A | 11/1994 | Aebi et al. | |
| 5,620,757 A | 4/1997 | Ninomiya et al. | |
| 5,817,381 A | 10/1998 | Chen et al. | |
| 5,840,354 A | 11/1998 | Baumann et al. | |
| 6,027,758 A | 2/2000 | McHugh et al. | |
| 6,458,405 B1 | 10/2002 | Roy et al. | |
| 6,623,779 B1 | 9/2003 | Huxsoll et al. | |
| 6,663,910 B2 | 12/2003 | Soumya et al. | |
| 6,862,980 B2 | 3/2005 | Heil et al. | |

FOREIGN PATENT DOCUMENTS

| | | |
|---|---|---|
| JP | 59213364 | 12/1984 |
| JP | 59213365 | 12/1984 |
| JP | 62130657 | 6/1987 |
| JP | 62239963 | 10/1987 |
| JP | 1016563 | 1/1989 |
| JP | 1027442 | 1/1989 |
| JP | 1206965 | 8/1989 |
| JP | 9056340 | 3/1997 |

OTHER PUBLICATIONS

"Fruit Sticks—cherry"—Product Wrapper distributed by Twin Laboratories Inc. Ronkonkoma NY 11779 USA.
Gorman, J.; "Tasteful new wrapping can protect produce"; *Science News*; 159(1):5 (2001).
McHugh, T.H., et al.; "Extrusion processing of peach puree-based restructured fruit products"; *IFT Annual Meeting Book of Abstracts*; p. 183 (1996).
McHugh, T.H., et al., "Permeability Properties of Fruit Puree Edible Films"; *Journal of Food Science*; 61(1):88-91 (1996).
McHugh, T.H., et al.; "Fruit Puree-Based Edible Films and Coatings"; *In: Chemistry of Novel Foods* (Eds) Spanier, A., Tammura, M. and Mills, O. (1997) Chapter 13 pp. 167-177.
McHugh, T.H., et al.; "Apple-Based Edible Wraps Extend the Shelf Life of Fresh Cut Apples"; *IFT Annual Meeting Book of Abstracts*; 20A-23, p. 32 (1998).
McHugh, T.H., et al.; "Apple Wraps: A Novel Method to Improve the Quality and Extend the Shelf Life of Fresh-cut Apples"; *Journal of Food Science*; 65(3):480-485 (2000).
McHugh, T.; "Fruit and Vegetable Edible Wraps"; *Asia Food Tech.*; 2(4):18-20 (2001).
McHugh, T.H.; "Edible Packaging"; *Resource Magazine*; pp. 7-8 (Nov. 2001).
McHugh et al., "Fruit and Vegetable Wraps; Application to Partially Dehydrated Apple Pieces"; *In Quality of Fresh and Processed Foods*; edited by F. Shahidi, A. Spanier, C-T. Ho and T. Braggins; Kluwer Academics/Plenum Publishing (2004) Chapter 21 pp. 289-299.
Senesi, E. et al.; "Film e coperture eduli can matrici a base di frutta"; *Industrie Alimentari*; pp. 1289-1294 (XLI dicembre 2002).
Senesi, E.; "Nuovi Utilizzi Dei Derivati Di Frutta: Film Eduli"; (2003) (Translation Provided) http://www.macfrut. com/ita/conv _ 2003/relazioni/fideghelli l242_ senesi. htm.
Stellijes, K.B., "Fruit and Vegetable Films Keep Food Fresh and Tasty"; (2000) http://www.ars.usda.gov/is/pr/2000/001218.htm.
*Wiley Encyclopedia of Food Science and Technology* (2nd Edition) vols. 1-4, John Wiley & Sons, 1999.

* cited by examiner

*Primary Examiner* — Vera Stulii

(57) ABSTRACT

The present invention is directed to monolayer, bilayer, and multilayer films made from fruit, vegetable or a combination thereof, which films have the thinness, strength, flexibility, and crispness to serve as alternates or substitutes for seaweed-based films such as nori, while providing the nutrition and flavor of fruits and vegetables. The films are useful for wrapping around a multiplicity of foods, and can be used to provide wrapped foods, including for example fruit and vegetable wrapped sushi and onigiri.

13 Claims, No Drawings

FRUIT AND VEGETABLE FILMS AND USES THEREOF

CROSS-REFERENCE TO RELATED APPLICATION

This application is a continuation of U.S. patent application Ser. No. 10/937,183, filed Sep. 8, 2004, now U.S. Pat. No. 8,048,466; the disclosure of which is herein incorporated by reference in its entirety.

BACKGROUND OF THE INVENTION

1. Field of the Invention

The present invention relates to fruit and vegetable films. More particularly, the invention relates to fruit and vegetable-based sheet films which have the thinness, strength, flexibility, and crispness to serve as alternatives for seaweed-based films such as nori, while providing the nutrition, flavor, and color of fruits and vegetables. The films are useful for wrapping around a multiplicity of foods, and can be used to provide fruit and vegetable wrapped sushi and onigiri.

2. Description of the Art

There is a need for a wide range of convenient, nutritious, tasty foods, including handheld foods and snack foods. A convenient way to present such foodstuffs is as a wrapped food. Examples of wrapped foods are Japanese temaki sushi (hand roll and cone) and onigiri/omusubi (rice ball). Presently the primary sheet product used to wrap sushi and onigiri/omusubi is "nori," an algae-based food made of seaweed of the genus *Porphyra* which has been processed and dried into sheets. This product is prepared by a process similar to making paper. An important unique characteristic of seaweed nori sheets is the ability to cleanly fracture on a crease when folded. This property in combination with the properties of high strength-to-weight ratio and high strength at low moisture make it possible to form thin sheets useful to wrap around foods. Although nori is popular, particularly in Asian countries, many consumers do not find the taste or texture of seaweed appealing.

There are alternatives to nori seaweed on the market. Examples include Rainbow Seaweed, a colored sheet that is 100% starch, and a cabbage-based vegetable sheet that has long cabbage fibers. However, these have been reported as having poor mouth feel and little or no flavor. A flavorful vegetable or fruit alternative to seaweed nori sheets could increase the appeal of healthy food products to a larger segment of the population globally.

Both national and international efforts are being made to educate people of the health benefits of eating fruits and vegetables. The U.S. Department of Agriculture Food Guide Pyramid advises mature adults to consume 2-4 servings of fruit and 3-5 servings of vegetables per day. The "5-A-Day for a Better Health Program" is sponsored by the National Cancer Institute and the Produce for Better Health Foundation for the purpose of improving public health by eating at least 5 servings of fruits and vegetables. Because consumers desire convenience and variety in their foods, foods wrapped with fruit or vegetable wraps can fill an important need in increasing consumption of fruits and vegetables, and providing nutritious, tasty foods, including handheld foods, snack foods, and convenience foods.

Edible fruit and vegetable foods have been reported. Intermediate-moisture formed food products made from partially dehydrated fruit or vegetable pieces and a gelled matrix have been reported by Huxsoll et al. in U.S. Pat. No. 6,623,779. Seventy to 100% fruit and vegetable bars produced using twin screw extrusion have been reported by McHugh et al. in U.S. Pat. No. 6,027,758.

Fruit-based edible wraps and vegetable-based edible wraps which may use lipids in the formulation have been reported by Senesi and McHugh, (2002), "Film e coperture eduli con matrici a base di frutta," *Industrie Alimentari* XLI dicembre. 1289-1294; McHugh and Senesi, (2000) "Apple Wraps: A Novel Method to Improve the Quality and Extend the Shelf Life of Fresh-Cut Apples," *Journal of Food Science* 65(3): 480-485; McHugh, "Fruit and Vegetable Edible Wraps," *Asian Food Tech.* 2(4): 18-23 (2001); McHugh, "Edible Packaging," *Resource Magazine*, November: 7-8. (2001); McHugh et al., (2004), "Fruit and Vegetable Wraps Application to Partially Dehydrated Apple Pieces," In "Quality of Fresh and Processed Foods" edited by F. Shahidi, A. Spanier, C-T. Ho and T. Braggins, Kluwer Academics/Plenum Publishing, Chapter 21, pp. 289-299; McHugh et al., (1998) "Apple-based Edible Wraps Extend the Shelf Life of Fresh Cut Apples," Abstract #20A-33, IFT Annual Meeting Book of Abstracts.

Fruit puree edible films and coatings and their properties have been reported by McHugh et al., "Fruit Puree-Based Edible Films and Coatings." (1997), In Chemistry of Novel Foods, Spanier, A., Tamura, M. and Mills, O. (Eds.), Allured Publishing Corporation, Carol Stream, Ill. pp. 167-198; McHugh et al., (1996), "Permeability Properties of Fruit Puree Edible Films," *Journal of Food Science* 61(1): 88-91.

Jerky, leather, or rope-type products for human or pet foods which contain a fruit or vegetable ingredient have been reported. See U.S. Pat. Nos. 5,853,836; 5,773,070; 5,549,921; 5,084,296; 4,631,837; 4,565,702; 4,205,093.

Gelled food compositions are reported in U.S. Patent Application No. 2002/0168460 and U.S. Pat. No. 6,663,910. Snack foods, edible film snacks, or rolled edible films have been reported in U.S. Patent Application Nos. 2003/0224090 and 2004/0043134 and U.S. Pat. Nos. 6,596,298; 5,962,053; 5,264,235.

Edible films for use as coating or gel capsule application which do not contain a fruit or vegetable ingredient have been reported. See U.S. Pat. Nos. 6,699,315; 6,375,981; 6,083,582; 5,928,692.

What is desired are fruit, vegetable or fruit and vegetable-based films which have the properties to serve as alternates or substitutes for seaweed-based films.

SUMMARY OF THE INVENTION

The present invention is directed to films made from fruit, vegetable or a combination thereof which have the thinness, strength, flexibility, and crispness to serve as alternates or substitutes for seaweed-based films such as nori, while providing the nutrition and flavor of fruits and vegetables. The films are useful for wrapping around a multiplicity of foods, and can be used to provide wrapped foods, including for example fruit and vegetable wrapped sushi and onigiri.

In particular, the present invention is directed to a film having a fruit, vegetable or fruit and vegetable layer, wherein the layer has at least 75% fruit, vegetable or combination of fruit and vegetable puree calculated on a percent solids basis, and wherein the film has a dry film thickness in the range of about 4 to about 7 mils (about 0.1 to about 0.18 mm), a moisture content in the range of about 4 to about 8%, and a water activity in the range of about 0.2 to about 0.6.

In one aspect, the film of the invention comprises a bilayer film comprising an edible polymer layer and a fruit, vegetable or combination fruit and vegetable layer, wherein the fruit, vegetable and combination fruit and vegetable layer has about 75% to 100% fruit, vegetable or combination of fruit and vegetable, respectively, calculated on a percent solids basis.

In another aspect, the film of the invention is a monolayer film that is fruit-based, vegetable-based or vegetable and fruit-based. In this aspect, the fruit-based monolayer film comprises about 75% to about 90% fruit calculated on a percent solids basis; the vegetable-based monolayer film comprises about 75% to 100% vegetable calculated on a percent solids basis and the combination fruit and vegetable-based monolayer film comprises about 75% to 100% combination fruit and vegetable calculated on a percent solids basis.

In still another aspect, the film of the invention is a multilayer film comprising a bilayer film as described above and including one or more additional layers.

The films can be packaged in sheets, rolls, or any convenient form for subsequent use by the end user. The films or film products are packaged so as to maintain the desired film water activity and percent moisture, for example, in moisture barrier bags or other containers or in oxygen and moisture barrier bags and containers, for example, metalized bags. A desiccant can be incorporated into a film package or film product package to absorb moisture during storage and maintain the desired crispy properties. Alternatively, the films can be directly used for preparing products.

The films are useful for wrapping around foods to provide a wide range of convenient, nutritious, tasty foods, including handheld foods and snack foods. A particular use of the invention is to wrap sushi and onigiri/omusubi to provide products for consumers who desire alternatives to seaweed-wrapped food products. However, the films can be used to wrap a multiplicity of foods, and another aspect of the invention is products wrapped with a film of the invention. The films can also be applied between foods. The films can add additional appeal to a product by added nutrition, flavor, color, and novelty. In this way, the films of the invention provide products which are healthy, convenient, flavorful, colorful, have ready-to-eat convenience, and provide interesting tastes and textures. The products may be prepared for immediate consumption or for future consumption. If for future consumption, it is preferred that the products be wrapped so as to maintain the dry, crisp properties of the film of the invention.

The invention also encompasses methods of making the films and wrapped products.

A particular advantage of the films of the invention is that they provide the unique properties of thinness, strength, flexibility, and crispness to serve as alternatives for seaweed-based films such as nori, while providing the nutrition and flavor of fruits and vegetables.

Another advantage of the films of the invention is that they fill the important need of providing fruit and vegetable products to increase consumption of fruits and vegetables and help consumers meet daily dietary requirements.

A still further advantage of the invention is the provision of nutritious, tasty foods, including handheld foods, snack foods, and convenience foods. The provision of low fat and low calorie nutritious foods is important to consumers globally, and the invention can provide an important tool in combating the problem of increasing obesity.

Accordingly, it is an object of the invention to provide fruit, vegetable or combination fruit and vegetable films that have the unique properties of thinness, strength, flexibility, and crispness to serve as alternatives for seaweed-based films such as nori, while providing the nutrition and flavor of fruits and vegetables.

A further objection of the invention is the provision of food products wrapped with the films of the invention.

A still further object of the invention is the provision of methods for making the films and products of the invention.

Other objects and advantages of the invention will become readily apparent from the ensuing description.

DETAILED DESCRIPTION OF THE INVENTION

General Definitions

An edible film is a thin layer of edible material. Edible films are pre-formed into solid sheets which can then be applied on, around or between foods, food components or ingredients.

A fruit or vegetable puree refers to a paste or liquid suspension usually made by grinding a fruit or vegetable. Fruit or vegetable purees are prepared from whole flesh, or if such purees have been partially dehydrated, fruit or vegetable paste. In this manner, purees are intermediate products that can be used for processing into different final products. Purees can be heat treated, aseptically or otherwise, but do not necessarily have to be heat treated. As used herein, "puree" is meant to refer to both heat and non-heat treated whole fruit or vegetable pieces which have been mechanically transformed, such as under a screening or pulping device, into viscous slurries. Thus, this comminuted fruit or vegetable material can be distinguished from individual discrete pieces of intact fruit or vegetable flesh. Purees can range in moisture from 4% in dried form to 98% in dilute form.

Percent ingredient is expressed as [(weight of ingredient/total weight of formulation)×100].

Percent ingredient expressed on a percent solids basis of a formulation is calculated as [(weight of the ingredient×percent solids of the ingredient)/(sum of (weight of each ingredient in the formulation×percent solids of each ingredient in the formulation))×100]. Calculations are illustrated in Example 1 below.

Water Activity is defined as the amount of unbound, free water in a system available to support biological and chemical reactions (Potter, Food Science, $4^{th}$ Ed., p. 296, AVI Publishing Co., Westport, Conn. (1986). Water activity is a concept that differs from that of absolute water content of a particular food. Some foods may have high levels of total water content while at the same time possess low water activity. The equation for water activity is: $A_w = VP/VP_0$, where VP is the partial vapor pressure of the food at temperature T and $VP_0$ is the saturation vapor pressure of pure water at T. This ratio provides the amount of free water present in the food expressed as the equilibrium state of the unbound water content in relation to the vapor pressure of the surrounding environment in which the food is stored under conditions of room temperature and atmospheric pressure.

Moisture content is determined using the AOAC (Association of Analytical Communities) official method 22.012. It can also be determined using a Karl Fisher titrator or by other methods as known in the art.

Films of the Invention

The present invention is directed to films made from fruit, vegetable or a combination thereof which have the thinness, strength, flexibility, and crispness to serve as alternates or substitutes for seaweed-based films such as nori, while providing the nutrition and flavor of fruits and vegetables. Films encompassed by the present invention include bilayer films comprising a fruit, vegetable or combination fruit and vegetable layer and an edible polymer layer; monolayer films that are fruit-based, vegetable-based or vegetable and fruit-based, or multilayer films comprising a bilayer film as described above and including one or more additional layers. The films are formulated wherein the wet cast formulation contains at least 75% fruit, vegetable or combination of fruit and vegetable calculated on a percent solids basis of the total wet cast formulation.

The films of the invention comprise the following unique combination of properties: a dry film thickness in the range of about 4 to about 7 mils (about 0.1 to about 0.18 mm), a moisture content in the range of about 4 to about 8%, and a water activity in the range of about 0.2 to about 0.6, wherein the film includes a fruit, vegetable or fruit and vegetable layer which comprises at least 75% fruit, vegetable or combination of fruit and vegetable puree calculated on a percent solids basis. The water activity of the dry film may also be in the range of about 0.35 to about 0.6. A preferred moisture content is in the range of about 4.5 to about 7% and more preferably in the range of about 4.5% to about 5.5%.

In a preferred embodiment, the size of the particles in the fruit, vegetable or combination fruit and vegetable layer is no greater than about 1700 micrometers. The size of the particles in the fruit, vegetable or combination fruit and vegetable layer may preferably range from about 15 to about 1700 micrometers. A preferred particle size is in the range of 24 to about 1000 micrometers. Particle size ranges within these ranges are encompassed by the invention, for example, a particle size in the range of about 50 to about 500 micrometers and a particle size in the range of about 75 to about 500 micrometers.

Surprisingly, by providing this unique combination of thinness, moisture content, and water activity, for the first time, fruit and vegetable-based films having 75% or greater fruit, vegetable, or combination fruit and vegetable puree were obtained which are thin, strong, flexible or bendable and crisp or crunchy, and which can serve as alternates for seaweed-based films such as nori. Development of fruit, vegetable or combination fruit and vegetable films having these properties required overcoming difficult challenges.

The films of the invention are prepared using mixing and casting and drying as known in the art.

The films are useful for wrapping around a multiplicity of foods, and can be used to provide wrapped foods, including for example fruit and vegetable wrapped sushi and onigiri.

The films can be packaged in sheets, rolls, or any convenient form for subsequent use by the end user. The films are packaged so as to maintain the desired water activity and percent moisture as described above, for example, in moisture barrier bags or other containers, or in oxygen and moisture barrier bags and containers, for example, metalized bags. Alternatively, the films can be directly used for preparing products.

Bilayer Films of the Invention

In a preferred embodiment, the film of the invention comprises a bilayer film. For the purposes of this invention, the term "bilayer film" refers to a film comprising a fruit, vegetable or combination fruit and vegetable layer and an edible polymer layer. Each layer is formulated, and then the bilayer film is prepared. In a preferred embodiment of the preparation of the bilayer film, an aqueous solution of the edible polymer is prepared, then the solution is cast onto a suitable carrier substrate and dried to form the edible polymer layer. The fruit, vegetable or combination fruit and vegetable layer is formulated by blending or mixing the fruit, vegetable or combination fruit and vegetable ingredients and any optional ingredients together to form a film-forming solution. This solution is cast onto the edible polymer layer and dried to form the bilayer film.

Formulation of the Fruit, Vegetable or Combination Fruit and Vegetable Layer of the Bilayer Film The fruit, vegetable or fruit and vegetable layer of the bilayer film comprises about 75% to 100% fruit, vegetable or combination of fruit and vegetable, respectively, calculated on a percent solids basis.

The fruit component in the layer may comprise one type of fruit alone or two or more types of fruit. Any fruit may be used. Without being limiting, examples include apple, peach, pear, strawberry, raspberry, cranberry, blueberry, mango, banana, cherry, apricot, rhubarb, guava, raisin, and date.

The vegetable component in the layer may comprise one type of vegetable alone or two or more types of vegetables. Without being limiting, examples include carrot, tomato, broccoli, bell pepper, pumpkin, kobocha (Asian pumpkin), squash, corn, sweet potato, spinach, green bean, green pea, and asparagus. For the purposes of this invention, the vegetable component can also be other plant material suitable for human consumption, for example, wheatgrass, and green tea.

The combination of fruit and vegetable components in the layer comprises one or more types of fruits and one or more types of vegetables as described above in any combination, mixture or blend of fruit and vegetable purees. For example, a fruit ingredient can be used to provide additional sweetness, and/or flavor or color to a combination fruit and vegetable film. A vegetable ingredient can be used to provide additional strength, crispness, and/or flavor or color to a combination vegetable and fruit film. Fruit and vegetable combinations include, for example, spinach and peach; spinach and mango; spinach and apple; spinach and pear; pumpkin and apple; peach and yellow squash; corn and white grape. Without being limiting, combinations may be 50:50; 60:40; 70:30; 80:20; 90:10; 95:5; 99.9:0.1; 100:0 ratios of fruit:vegetable or vegetable:fruit or any ratio in between.

In making the fruit, vegetable or combination fruit and vegetable layer of the invention, a film forming solution, hereinafter denoted as "wet cast formulation" is prepared. The fruit, vegetable, or combination fruit and vegetable component is provided as a puree. The puree may be made from one type of fruit or vegetable alone, a blend or mixture of fruits, a blend or mixture of vegetables, or a combination, mixture or blend of fruit and vegetable purees. As discussed in detail below, other ingredients may be included in the wet cast formulation. However, in all cases, the percent of fruit, vegetable or combination of fruit and vegetable purees in the wet cast formulation calculated on a percent solids basis of the total wet cast formulation is about 75% to about 100%, preferredly about 80% to 100%. Percentages within these ranges, e.g., 76 to 80%; 80 to 98%; 83 to 95%; and 85 to 90%, may be used. This is illustrated in the examples below. The remaining percent solids of the wet cast formulation is made up of the other ingredients as discussed in detail below and in the examples.

The percent moisture of the starting puree can vary. A base puree may be dried or diluted as needed to obtain the desired percent solids.

Other ingredients may be incorporated into the wet cast film formulation in an amount sufficient to obtain a desired characteristic while maintaining the thinness, strength, flexibility, and crispness of the final film produced by the formulation. Without being limiting, examples of other ingredients include edible plasticizer sources, edible polymers including soluble fiber sources, edible insoluble fiber sources, flavor ingredients or enhancers; and color sources or enhancers. The other ingredients may be added in an amount to provide flexibility, fiber, tensile strength, flavor, color or other advantageous property; however, the concentration should not be so high that the added ingredient substantially separates out of the wet film casting formulation. The total percentage of all other ingredients calculated as a percent solids basis in combination with the total percentage of the fruit, vegetable or combination fruit and vegetable purees expressed on a total solids basis is 100% solids. Thus, the combination of all other ingredients can not be more than 25% calculated on a percent solids basis of the wet film formulation. Generally, a flavor or color ingredient is from about 0 to 1%. The plasticizer, polymer sources and insoluble fiber sources may be added individually or in combination. They may be included in the range of about 0% to about 25%, from about 0% to 20%; from about 0.05% to about 20%; from about 0.04% to 21.06%; from about 3% to 15%; from about 5% to 12%; from about 8% to 10%; from about 3% to 5%; from about 5% to 8% or ranges in between, with the caveat that the total of all other ingredients and purees makes up 100% solids. If the added ingredient is a solid, it is preferred that it is mixed with water or solubilized before mixing into the wet cast film formulation.

As discussed above, one or more ingredients may be added which provide film flexibility, herein referred to as edible plasticizers. Without being limiting, examples of edible plasticizer sources include sugar sources, including glycerin, sorbitol, glycerides, sucrose, glucose, fructose, high fructose corn syrup, xylose, polyols, glycols, or mixtures thereof. Fruit concentrate may also be used as a plasticizer source. This ingredient has the advantage of being a natural food source. The edible plasticizer is added in an amount to achieve the desired property while maintaining the thinness, strength, flexibility, and crispness of the film produced by the formulation.

Ingredients may be added to the wet cast formulation to provide improved film tensile strength. Exemplary ingredients included edible polymer sources including edible fiber sources. Without being limiting, examples include carboxymethylcellulose, methylcellulose, hydroxypropylmethylcellulose, guar gum, locust bean gum, cellulose gum, xanthan gum, carrageenan, algins, propylene glycol, pectins, gum arabic, native starches including corn starch, waxy maize starch, high-amylose corn starch, potato, tapioca, rice and wheat starch, modified starches including acid modified, bleached, oxidized, esterified, etherified, crosslinked, and enzymatically-treated starches; starch hydrolyzed products including maltodextrin; protein including gelatin, casein, salts of casein, whey, and protein derived from soybeans.

Edible insoluble fiber sources may be added to the wet cast formulation to provide advantageous properties such as increased crispness and/or reduced tackiness. Examples include lignin, wood pulp, powdered cellulose, e.g., Solka Floc®. Alternatively or in combination, an edible insoluble fiber can be sprinkled onto the cast film.

Flavor sources, sweeteners, coloring ingredients or flavor or color enhancers, may be added in an amount sufficient to obtain a desired appearance and/or taste while maintaining the thinness, strength, flexibility, and crispness of the film produced by the formulation. Flavor sources include any food approved natural or artificial flavor source or enhancer or combinations thereof. These include for example seasonings or spices or flavors or combination thereof. Any desired flavor combination is encompassed by the invention. Examples include tomato basil, carrot ginger; pizza-flavored tomato; Mexican seasoning; Italian seasoning-flavored; curry; pumpkin spice. Sweeteners include any food approved natural or artificial sweetener source or combinations thereof. These include for example, sucrose, glucose, aspartame. Color sources include any food approved natural or artificial color or color enhancer or combinations thereof.

Preparation of the wet cast formulation and properties of the formulation of the fruit, vegetable or combination fruit and vegetable layer. The layer can be formed by a variety of processes as known in the art. One process is to blend or mix the fruit, vegetable or combination fruit and vegetable puree and the optional ingredients together to form the wet cast formulation. It is preferred that the wet cast formulation is substantially homogeneous.

Particle size. In the present invention, it is preferred that about 80% of the particles in the wet cast solution are smaller than about 75% of the thickness of the wet film cast from the solution. Thus, for example, when casting a carrot-based film of 35 mils (889 micrometers) wet cast thickness, it is preferred that about 80% of the particles in the solution have a particle size smaller than about 26.2 mils (665 micrometers).

In the case of tomato puree where the wet casting thickness is about 25 mils (635 micrometers), it is preferred that about 80% of the particles in the solution puree have a particle size smaller than about 19 mils (476 micrometers).

In the case of broccoli puree where the wet casting thickness is about 50 mils (1,270 micrometers), it is preferred that about 80% of the particles in the puree have a particle size smaller than about 37.5 mils (952.5 micrometers).

The viscosity of the fruit, vegetable or combination fruit or vegetable wet cast formulation is generally about 6000 to about 25000 cPs.

The brix of a formulation can vary based on the fruit, vegetable or combination fruit and vegetable puree in a the formulation and the other ingredients in the formulation. The brix of a tomato-based formulation as described in the Example below was about 16 to about 17 brix. The brix of the broccoli formulation was about 4 to 5 brix. The brix of the carrot-garlic and carrot-ginger wet cast formulations was about 8 to 10 brix.

Formulation of the Edible Polymer Layer of the Bilayer Film

In making the edible polymer layer of the bilayer film, a film forming solution, that is, a wet cast formulation is prepared from an edible film-forming polymer such as hydroxypropylmethylcellulose (HPMC). Other film-formers which are commonly used include edible polymers, including carboxymethylcellulose, methylcellulose, guar gum, locust bean gum, xanthan gum, carrageenan, algins, propylene glycol, pectins, gum arabic, native starches including corn starch, waxy maize starch, high amylose corn starch, potato, tapioca, rice and wheat starch, modified starches including acid modified, bleached, oxidized, esterified, etherified, crosslinked, and enzymatically treated starches; starch hydrolyzed products including maltodextrin; protein including gelatin, casein, salts of casein, whey, and protein derived from soybeans; polymers including polyvinyl pyrrolidone, methycrylate copolymer, carboxyvinyl copolymers, polydextrose or mixtures of the foregoing. Other ingredients may be included, for example, flavor may also be included in the edible polymer layer. The edible polymer film forming solution is an aqueous solution in the range of about 1 to 20% HPMC or other edible polymer. The preferred range is between 5 and 20% and the most preferred range is between 10 and 20%. Other concentrations are encompassed by the invention including 6 to 18%, 6 to 12%. As discussed in the Example below, a convenient film forming solution is an aqueous solution comprising 17.5% HMPC, which is wet cast at about 2 mils.

Casting of the Bilayer Film

Any coating technique as known in the art may be used to form a film of the invention. In the following description, casting of the film is described using the technique denoted as Knife Over Roll Coating "Gap Coating." This process relies on a coating being applied to the substrate which then passes through a 'gap' between a 'knife' and a support roller. As the coating and substrate pass through, the excess is scraped off. Other techniques are also encompassed by the invention, such as Gravure Coating, Reverse Roll Coating, Metering Rod (Meyer Rod) Coating, Slot Die (Slot, Extrusion) Coating, Immersion (Dip) Coating, Curtain Coating, and Air Knife Coating.

In the preferred embodiment of making the bilayer film, the edible polymer layer is cast onto a suitable carrier substrate. A suitable carrier substrate is one that is impermeable to the edible polymer layer, allows the edible polymer formulation to disperse substantially evenly onto the substrate and allows for easy removal of the edible polymer layer from the substrate. Exemplary of such substrates are Mylar® (strong, heat-resistant polyester film), Teflon® (polytetrafluoroethylene), silicone, cellophane and the like. The edible polymer layer is then dried to form a film. The thickness of the dried edible polymer film layer is generally in the range of about 0.2 to about 0.7 mil (about 5 to about 18 micrometers).

Drying may be carried out as needed to obtain the desired dryness by procedures known in the art, including heating in a tunnel oven, dehydrator and the like. Additional drying steps may be carried out as desired. Infrared drying may be used to augment the hot air impingement drying process.

Next, the wet cast formulation comprising fruit, vegetable or combination fruit and vegetable puree with or without added other ingredients is cast onto the edible polymer layer. The wet cast thickness is generally in the range of about 10 to about 50 mils. Other ranges are also encompassed including for example a wet thickness of 20 to 50 mils, 20-45 mils, 30 to 45 mils, or 30 to 40 mils. The film is dried. Drying may be carried out as needed to obtain the desired dryness as discussed above. Additional drying steps may be carried out as desired.

Any convenient width or length of film may be cast, e.g., 12 inches or 27 inches wide, and wound on a take up roll.

The pre-formed solid sheet bilayer films can be used immediately to make products as discussed below or can be stored for future use. Storage is preferably carried out so as to maintain the crispness of the films. Bulk rolls can be further processed for specific applications as discussed below.

Properties of the Films

The films of the invention have the following unique combination of properties: a dry film thickness in the range of about 4 to about 7 mils (about 0.1 to about 0.18 mm), a moisture content in the range of about 4 to about 8%, and a water activity in the range of about 0.35 to about 0.6, wherein the film includes a fruit, vegetable or fruit and vegetable layer which comprises at least 75% fruit, vegetable or combination of fruit and vegetable puree calculated on a percent solids basis. If needed to meet the desired percent moisture requirements, the films can be dried further subsequent to the film casting and production process. The thickness of the film includes the contribution of the edible polymer layer which ranges generally from about 0.2 to about 0.7 mil (about 5 micrometers to about 18 micrometers). In a preferred embodiment, the size of the particles in the fruit, vegetable or combination fruit and vegetable layer is no greater than about 1700 micrometers. The particle size range in sample carrot, tomato, and broccoli bilayer films is given in Tables 2-4 in Example 1, below.

The weight of the films is in the range of about 1.4 to about 3.5 grams per 24 square inch sheet of film, preferably in the range of about 1.4 to about 3.0 grams per 24 square inch sheet of film and more preferably in the range of about 2.5 to about 2.7 grams per 24 square inch sheet of film. Preferably, the films have a crisp mouth feel, desirable flavor, minimal cracking, and translucent to solid color, that is, the film has minimal streaking. When cast on a Mylar® substrate, the film has a smooth texture on the side that was cast directly onto the Mylar® and a rough texture on the opposite side. In sum, the films are nutritious, thin, bendable and crisp, and have strength at low moisture. This is contrast to chewy fruit leathers and other prior fruit and vegetable edible films or leathers.

Tensile strength characteristics are important attributes for the films of the invention. The tensile strength will determine the maximum strength of a film and the elastic modulus and elongation will determine the flexibility of a film. Tables 5A-C and 6A-C in Example 1 below show the tensile strength including maximum strength at break, elastic modulus, and elongation of sample carrot and tomato bilayer films of the invention.

Monolayer Films of the Invention

The term monolayer film refers to a fruit-based, vegetable-based film or a combination vegetable and fruit-based film which does not include an edible polymer layer described above with reference to the bilayer films of the invention. The monolayer films also have the unique combination of properties as discussed above, namely, a dry film thickness in the range of about 4 to about 7 mils (about 0.1 to about 0.18 mm), a moisture content in the range of about 4 to about 8%, and a water activity in the range of about 0.2 to about 0.6. In a preferred embodiment, the size of the particles in the dry films is no greater than about 1700 micrometers. The size of the particles may preferably range from about 15 to about 1700 micrometers. A preferred particle size is in the range of 24 to about 1000 micrometers. Particle size ranges within these ranges are encompassed by the invention.

In making the fruit, vegetable or combination fruit and vegetable monolayer film of the invention, the fruit, vegetable, or combination fruit and vegetable component is formulated by blending or mixing the fruit, vegetable or combination fruit and vegetable ingredients and any optional ingredients together to form a film-forming solution. This solution is cast onto a substrate and dried to form a film. As in the bilayer embodiment, the fruit, vegetable, or combination fruit and vegetable component is provided as a puree.

In the fruit-based monolayer film, the percent fruit puree in the wet cast formulation is about 75% to about 90% calculated on a percent solids basis of the wet cast formulation. Percentages within these ranges can also be used, for example, 80% to 85%. As with the bilayer film, any fruit may be used, and one type of fruit may be used alone or two or more types may be combined. Other ingredients (10 to 25% calculated on percent solids basis of the wet cast formulation) may be incorporated into the wet cast film formulation, with the caveat that the total of all other ingredients and purees makes up 100% solids. Without being limiting, examples of other ingredients include edible plasticizer sources, edible polymers including soluble fiber sources, edible insoluble sources, flavor ingredients or enhancers and color sources or enhancers as described above with reference to the bilayer film of the invention. Generally, a flavor or color ingredient is no greater than 1% of the wet cast formulation. The edible polymers including soluble fiber sources and/or edible insoluble fiber sources are added in an amount to provide desired strength and/or crispness to the dry film. It is preferred that about 95% of the 10 to 25% other ingredients comprise edible polymers, insoluble fiber sources or a combination thereof.

In the vegetable-based monolayer film, the percent vegetable puree in the wet cast formulation is about 75% to about 100% calculated on a percent solids basis of the wet cast formulation. Percentages within these ranges can also be used, as discussed above with reference to the vegetable layer of the bilayer film. As with the bilayer film, any vegetable may be used, and one type of vegetable may be used alone or two or more types may be combined. Other ingredients (0 to 25% calculated on percent solids basis of the wet cast formulation) may be incorporated into the wet cast film formulation, with the caveat that the total of all other ingredients and purees makes up 100% solids. Without being limiting, examples of other ingredients include edible plasticizer sources, edible polymers including soluble fiber sources, edible insoluble sources, flavor ingredients or enhancers and color sources or enhancers as described above with reference to the bilayer film of the invention. Generally, a flavor or color ingredient is no greater than 1% of the wet cast formulation. The edible plasticizer sources are added in an amount to provide desired flexibility to the dry film. The edible polymers including soluble fiber sources and/or edible insoluble fiber sources are added in an amount to provide desired strength and/or crispness to the dry film. As discussed above with reference to the vegetable layer of the bilayer film, the plasticizer sources, polymer sources, and insoluble fiber sources may be in the range of about 0 to about 25% or ranges in between, calculated on a percent solids basis.

In the combination fruit and vegetable-based monolayer film, the percent fruit and vegetable puree in the wet cast formulation is about 75% to about 100% calculated on a percent solids basis of the wet cast formulation. Percentages within these ranges can also be used, as discussed above with reference to the bilayer film. The types and combinations of fruit and vegetables is as described above with reference to the bilayer films. As discussed above in detail with reference to the bilayer films of the invention, the puree may be made from one type of fruit or vegetable alone, a blend or mixture of fruits, a blend or mixture of vegetables, or a combination, mixture or blend of fruit and vegetable purees. The combination fruit and vegetable component can be any ratio of fruit:vegetable to meet the desired properties of the dry film. This includes 50:50; 40:60; 30:70; 20:80; 10:90; 5:95 ratios of fruit:vegetable purees and ratios in between. Other ingredients (0 to 25% calculated on percent solids basis of the wet cast formulation) may be incorporated into the wet cast film formulation, with the caveat that the total of all other ingredients and purees makes up 100% solids. As discussed above, examples of other ingredients include edible plasticizer sources, edible polymers including soluble fiber sources, edible insoluble sources, flavor ingredients or enhancers and color sources or enhancers as described above with reference to the bilayer film of the invention. Generally, a flavor or color ingredient is no greater than about 1% of the wet cast formulation. As discussed above with reference to the bilayer film, the plasticizer sources, polymer sources, and insoluble fiber sources may be in the range of about 0 to about 25% or ranges in between, calculated on a percent solids basis.

The monolayer film is cast directly on the suitable carrier substrate and dried.

Multilayer Films of the Invention

Multilayer films comprise a bilayer film as described above and include one or more additional layers. The one or more additional layers may be a fruit, vegetable or combination fruit and vegetable-based layer; an edible polymer layer, or combinations thereof. The layers are cast and dried as described above for the bilayer film.

Products of the Invention

The pre-formed edible fruit, vegetable or combination fruit and vegetable films of the invention can be applied on, around or between foods, food components or ingredients. For example, the films of the invention can be used to provide nutritious, tasty foods, including handheld foods, portable foods, convenience foods, and snack foods. A convenient way to present such food is as a wrapped food. The films of the invention provide new, flavorful, visually appealing, colorful, healthy products that can be alternatives to dried seaweed wrapped sushi or onigiri (rice ball). This invention of a flavorful, colorful, visually appealing fruit and/or vegetable wrap alternative for the seaweed wrap used in sushi or onigiri addresses taste preferences and health concerns of global consumers, and allows for introduction of films with a variety of flavor combinations.

It is envisioned that a film of the invention be used as an alternative or as a substitute for dried seaweed sheets (nori) used in Japanese cuisine, such as sushi hand rolls. In this case, the California roll is wrapped in a fruit, vegetable, or combination fruit and vegetable film of the invention instead of seaweed nori. In making a "rice pocket", the tofu pouch in inari-zushi is substituted with a vegetable or fruit pouch made of a film of the invention.

It is envisioned that a film of the invention be used to wrap or enclose any food, food component or ingredient. Without being limiting, examples include any type of rice, couscous, tofu, potatoes, noodles, crab or other fish, meat, beans, nuts, oatmeal, cheese, vegetables, fruit, egg, polenta, bread, and a variety of gelled matrixes such as gelatin gels. The food or ingredient may be flavored as desired.

As discussed in the Example 2 below, a product can be prepared having a carrot ginger film wrapped around white rice with raisins and pineapple and small flakes of the base film for color or a tomato film wrapped around white rice flavored with basil and garlic. Other examples include, but are not limited to, oatmeal wrapped with a apple cinnamon film or peach film. In sum, any and all combinations of fruit films, vegetable films and combination fruit and vegetable monolayer, bilayer and multilayer films are envisioned for use to wrap or apply to or between any type and combination of ingredients to provide a multiplicity of products.

It is preferred that the films or film products of the invention be packaged so as to maintain the dry, crispy properties of the film of the invention. One way is to use a wrapper designed for wrapping two different foods as described in U.S. Pat. No. 4,784,864. The wrapper has an inner triangular-shaped bag made of food wrapping synthetic resin material for storing food, e.g., a mass of rice, therein and an outer triangular-shaped bag made of the same material enclosing the inner bag. The film of the invention is positioned between the heat sealed inner bag and outer bag so that the film and rice are not contacted until the wrapper is opened by the consumer. Also, the films or products may be packaged in moisture barrier containers or oxygen and moisture barrier containers. Exemplary of such containers are metalized bags. In addition, a desiccant can be incorporated into a film package or film product package to absorb moisture during storage and maintain the desired crispy properties.

The films and/or products are stored as needed to maintain product quality as known to those in the art.

Products are prepared using methods known in the art. For example, preparation of a wrapped rice pocket is carried out as follows: the rice is washed, rinsed, cooked and flavored as desired. Desired portions of rice are wrapped with a film of the invention and distributed for immediate consumption or for future consumption. If for future consumption, it is preferred that products be wrapped so as to maintain the dry, crisp properties of the film of the invention.

The scope of the present invention is not limited to the uses discussed above or to the specific examples described below.

EXAMPLES

The following examples are intended only to further illustrate the invention and are not intended to limit the scope of the invention which is defined by the claims.

Example 1

The following examples describes the formulation and casting of films of the invention.
Materials Carrot puree was obtained from Stahlbush Island Farms, Inc., Corvallis, Oreg. The commercial product had been prepared by blanching; pureeing; pasteurizing at 185 degrees Fahrenheit; cooling to 36 degrees Fahrenheit and packing. It had about 12% solids (w/w); about 88% moisture; brix of about 10.5°; pH of about 5.4; and bright carrot orange color (color equal to 2.5 YR 6/14), and sensory typical of cooked carrots.

Tomato paste was obtained from California Fruit and Tomato Kitchens, Riverbank, Calif. The commercial product had been prepared by concentrating the screened juice from mature, red varieties of round and/or pear tomatoes, which had been washed, sorted, enzyme-deactivated by heat, and evaporated under vacuum to 24% minimum natural tomato soluble solids (NTSS). After filling, the product was heat processed in hermetically sealed containers and cooled, resulting in commercially sterile product. The paste had about 25% solids (w/w); about 75% moisture; brix of about 24.03°; pH of about 4.37; color of 48 points, and flavor/odor distinctive of ripe, good quality tomatoes with no off flavors.

Broccoli puree was obtained from Stahlbush Island Farms, Inc., Corvallis, Oreg. The commercial product had been prepared by blanching; pureeing; pasteurizing at 185 degrees Fahrenheit; cooling to 36 degrees Fahrenheit and packing. It had about 10% solids (w/w); about 90% moisture; brix of about 5.5.-6.5°; pH of about 5.8-5.9; and color equal to 2.5GY 6/8-2.5GY6/6; dark bright green with a shade of blue green and sensory typical of cooked broccoli.

Pectin was obtained that was sold under the name "TIC 1200" or "TIC Pretested® Pectin 1460 Powder" by TIC Gums, Inc., Belcamp, Md. This pectin is a natural purified polysaccharide extracted from the rind of citrus fruits. It occurs as an odorless, yellowish to tan free-flowing powder having a mucilaginous taste. It dissolves in water, forming an opalescent colloid solution. It is practically insoluble in alcohol. The major part of the pectin is comprised of (1-4) linked D-galacturonic acid units. Some of the carboxyl groups are esterified with methyl alcohol, while the remaining carboxylic units exist in the free acid form or ammonium salt. The physical and chemical standards are: pH 3.4.-4.2; degree of esterification of 69% minimum; Loss on drying 10% maximum.

Powdered cellulose sold under the "Solka Floc®" was obtained. It is a highly purified cellulose and is composed of beta-1,4-glucan units. It is a white, odorless, and flavorless solid. As discussed in the Example below, water was added for mixing prior to addition to the casting formulation.

Pectin sold under the name "TIC Pretested® Pectin HM Slow Set Powder" by TIC Gums, Inc., Belcamp, Md. This pectin is a natural purified and standardized polysaccharide extracted from the rind of citrus fruits. It occurs as an odorless, yellowish to tan, free-flowing powder having mucilaginous taste. It dissolves in water forming an opalescent colloid solution. It is practically insoluble in alcohol. The major part of the pectin is composed of (1-4) linked D-galacturonic acid units. Some of the carboxyl groups are esterified with methyl alcohol while the remaining carboxylic units exist in the free acid form or as an ammonium salt. Pectins vary in their jellification properties and therefore are normally standardized with sugars to yield a consistent gel. TIC Pretested® Pectin HM Slow has a grade of 150 (USA SAG). The mesh analysis is 98% through USS #60. The physical and chemical standards are: pH 3.4.-4.0; USA SAG 145-150; 12% maximum moisture; degree of esterification of 63-67.

Glycerin (glycerol) was obtained. It had about 100% solids.

Hydroxypropyl methylcellulose is available from Dow Chemical Company.

The salt solutions for tensile strength tests were prepared with Magnesium Chloride (Mallinckrodt Baker Inc., Paris, Ky.), Magnesium Nitrate (Mallinckrodt Baker Inc., Paris, Ky.), Sodium Chloride (Fisher, Fair Lawn, N.J.) and Anhydrous Calcium Sulfate (W.A. Hammond Drierite Company LTD, Xenia, Ohio).

Methods of Preparing and Casting the Films

Typical formulations for the carrot, tomato, and broccoli layer of the bilayer films are shown in the following Table 1.

TABLE 1

SOLIDS CALCULATION & FORMULAS

| Ingredient | Wt. (g.) | % Total Wt. | Trial Wt. (lbs.) | oz. | g. | Solids | Solids (lbs.) | % Solids |
|---|---|---|---|---|---|---|---|---|
| CARROT FORMULA | | | | | | | | |
| Carrot Puree | 100 | 73% | 300 | | | 12% | 36 | 76.1% |
| TIC 1200 (6% solution) (17.5% of Puree solids wt.) | 35 | 25.6% | 105 | | | 6% | 6.3 | 13.3% |
| Yellow #6 | 0.06 | 0.04% | 0.2 | 2.9 | 40 | 100% | 0.2 | 0.4% |
| Solka Floc ® | 1.5 | 1.1% | 4.8 | | | 100% | 4.8 | 10.2% |
| Water added to solka floc ® for mixing | | | 20 | | | | 47.28 | |
| Total | 136.56 | 100% | | | | | | |
| Total mix weight | | | 430 | | | | | |

TABLE 1-continued

SOLIDS CALCULATION & FORMULAS

| Ingredient | Wt. (g.) | % Total Wt. | Trial Wt. (lbs.) | oz. | g. | Solids | Solids (lbs.) | % Solids |
|---|---|---|---|---|---|---|---|---|
| TOMATO FORMULA | | | | | | | | |
| Tomato Paste | 100 | 50% | 300 | | | 25% | 75 | 86% |
| TIC 1200 (6% solution) (15% of Puree solids wt.) | 66 | 33% | 200 | | | 6% | 12 | 14% |
| Red# 40 (0.00015:1 paste) | 0.015 | | 0.045 | 0.72 | 10 | 100% | 0.045 | 0.1% |
| Water | 33 | 17% | 100 | | | | | |
| Total | 200 | 100% | | | | | 87 | |
| Total mix weight | | | 600 | | | | | |
| BROCCOLI FORMULA | | | | | | | | |
| Broccoli Puree | 100 | 50% | 300 | | | 10% | 30 | 83.3% |
| TIC Pretested ® Pectin HM Slow Set (6% soln) (10% of Puree solids wt.) | 17 | 8% | 50 | | | 6% | 3 | 8.3% |
| Glycerin (10% Puree solids wt.) | 1.0 | 0.5% | 3 | | | 100% | 3 | 8.3% |
| Water | 82 | 41% | 247 | | | | | |
| Total | 200 | 100% | | | | | 36 | |
| Total mix weight | | | 600 | | | | | |

The formulation of the edible polymer layer of the bilayer film was a 17.5% aqueous solution of HPMC.

The edible polymer layer was cast onto a Mylar® substrate at a wet cast thickness of about 2 mils at about 50 feet per minute and dried.

The following describes the procedure for preparing the wet cast carrot formulation described in Table 1. Two separate half batches were prepared using this method. First the carrot base ingredient (puree) specifications were verified. The base ingredient had a moisture content of 87.8%, Brix of 10.5, pH of 5.4, color equal to 2.5 YR 6/14. Aerobic plate count per gram of less than 10, total coliform count per gram of less than 10, and E. coli count of zero. The wet cast formulation was mixed as follows. In a separate container, ten pounds of water was added to 2.4 pounds of powdered cellulose Solka Floc® 300 to make a viscous solution. It was mixed thoroughly and retained for later addition to the base ingredient. Then 52.5 pounds of 6% TIC Pectin 1200 solution was added to the wet cast formulation vacuum mixing vessel. Agitator speed was set to about 50% (range 30% to 70%). Next 150 pounds of carrot puree was added to the vacuum mixing vessel. The solution was mixed for at least 10 minutes at 50% speed. The solution was heated to no more than 90 degrees F. Next 0.1 pounds of yellow dye #6 was added to the vacuum mixing vessel. The powdered Solka Floc® mixture was also slowly added to the vessel and mixed for at least 10 minutes at 50% speed. The temperature and agitator speed were monitored and adjusted as needed to maintain a vortex in the mixture during mixing. A vacuum was then pulled to greater than 26 in. Hg for at least 15 minutes. Slow agitation was maintained under vacuum. This procedure was then repeated to make a second batch. The first batch had a viscosity of 18,870 centipoise at 85° F. and a solids content of 11.3%. The second batch had a viscosity of 17,170 centipoise at 90° F. and a solids content of 11.2%. The two batches were then combined and held in the line pump holding container.

Process for Casting Carrot Film

The casting line preparation was completed to conform to Good Manufacturing Practices (GMP) for human food consumption. The tank solution temperature was 87° F. The casting box solution temperature was 76° F. The wet thickness was set to 30 mil. Infrared unit temperatures were: Bank 1, 156° F.; Bank 2, 160° F.; Bank 3, 157° F. Infrared blower speed was 70%; run pump speed 20%; oven humidity 4%; drum temperature 196° F. The film was heated in oven for 7.4 minutes. Film exit temperature was 181° F. This process resulted in a carrot film weight for a 4 by 6-inch piece of 1.480 g., with moisture content of 5.0%. Bulk carrot film was rolled into 478 foot by 27 inch roll.

The tomato and broccoli bilayer films were prepared using the formulations as described in Table 1 above. The tomato layer was cast at a wet cast thickness of about 25 mils. The broccoli film was cast at a wet cast thickness of about 50 mils. The films were dried.

Testing Methods

Sample Preparation for Tensile Strength Tests. Samples were prepared by using a striking die (The Right Image, Sacramento, Calif.). The die resembled a dog bone with the dimensions of 15 mm wide by 100 mm long that flared sharply into the grip handles, 35 mm wide by 25 mm long. The films were prepared into 8 to 10 sub-samples and repeated three times. Samples were equilibrated in a humidity chamber containing salt solutions of Anhydrous Calcium Sulfate ($CaSO_4$, Drierite), Magnesium Chloride ($MgCl_2$), and Sodium Chloride (NaCl), with equilibrium relative humidities of 0, 33, and 75%, respectively. The salt solutions were prepared in the laboratory by making a super saturated solution in boiling water. After cooling, the solutions were verified using a water activity meter (Aqua Lab, Pullman, Wash.).

Tensile Strength Testing Conditions. The tensile properties of the fruit and vegetable films were performed on an Instron Universal Testing Machine, 5500R (Instron Corporation Headquarter, Canton, Mass.) using a 100 N load cell. The ASTM method D882-91, 1991 was used in developing our standard method of testing. The thickness of the samples was measured to the nearest 0.001 mm using a micrometer before being placed in the pneumatic grips, 110 mm apart. The maximum pressure of the grips was 138 kPa. The rate of grip separation was 7.5 mm/min. The Series IX Materials Testing Software (Instron Corporation Headquarter, Canton, Mass.) was used to determine TS, EM, and % E. The room conditions were 25±3° C. and 40±10% RH. Samples were kept in a humidity chamber and taken out immediately before testing.

Particle Size was analyzed using a Beckman Coulter LS Particle Size Analyzer Model LS230 (Beckman Coulter Corporation).

Water Activity was measured using an AquaLab CX-2. Samples were prepared and analyzed in accordance with the instructions in the AquaLab Operator's Manual.

Results

The carrot film had a moisture content of 5%. The average results from 42 samples taken from the bulk roll produced was: Average weight=1.45 grams; Average thickness=4 mils; Average water activity=0.5.

The particle size data for the carrot, tomato, and broccoli bilayer films is given in Tables 2, 3, and 4, respectively. The tensile strength data for the carrot and tomato bilayer films are given in Tables 5A, 5B, and 5C, and Tables 6A, 6B, and 6C, respectively.

TABLE 2

Carrot Bilayer Film

| Sample | Mean μm | Median μm | % < 10 Size μm | % < 25 Size μm | % < 50 Size μm | % < 75 Size μm | % < 90 Size μm |
|---|---|---|---|---|---|---|---|
| 1 | 281.4 | 206.0 | 67.47 | 116.4 | 206.0 | 378.5 | 620.4 |
| 2 | 290.0 | 207.3 | 68.05 | 117.0 | 207.3 | 382.1 | 635.3 |
| 3 | 282.4 | 206.5 | 68.20 | 116.9 | 206.5 | 379.0 | 622.3 |

TABLE 3

Tomato Bilayer Film

| Sample | Mean μm | Median μm | % < 10 Size μm | % < 25 Size μm | % < 50 Size μm | % < 75 Size μm | % < 90 Size μm |
|---|---|---|---|---|---|---|---|
| 1 | 311.8 | 287.2 | 115.6 | 192.8 | 287.2 | 404.0 | 539.8 |
| 2 | 313.1 | 290.4 | 114.8 | 194.7 | 290.4 | 406.8 | 539.6 |
| 3 | 315.6 | 292.8 | 114.4 | 195.7 | 292.8 | 410.6 | 545.1 |

TABLE 4

Broccoli Bilayer Film

| Sample | Mean μm | Median μm | % < 10 Size μm | % < 25 Size μm | % < 50 Size μm | % < 75 Size μm | % < 90 Size μm |
|---|---|---|---|---|---|---|---|
| 1 | 673.8 | 551.1 | 83.75 | 232.4 | 551.1 | 1018 | 1503 |
| 2 | 648.3 | 525.9 | 78.81 | 218.5 | 525.9 | 969.8 | 1462 |
| 3 | 653.0 | 522.7 | 77.10 | 214.3 | 522.7 | 988.8 | 1485 |

TABLE 5A

Tensile Tests at 0% R.H.

| Sample | Rep. | Relative Humidity | Temp (° C.) | Strength at Max Load (MPa) | Elastic Modulus (MPa) | Strength at Auto Break (MPa) | Elongation at Auto Break (%) | Load at Max Load (N) |
|---|---|---|---|---|---|---|---|---|
| Carrot | 1 | 0% | 25 | 6.150 | 1958.023 | 2.475 | 0.389 | 7.596 |
| Carrot | 2 | 0% | 25 | 3.354 | 1107.037 | 1.229 | 0.662 | 4.142 |
| Carrot | 3 | 0% | 25 | 5.328 | 1684.831 | 5.328 | 0.254 | 6.580 |
| Carrot | 4 | 0% | 25 | 5.040 | 1574.553 | 5.040 | 0.242 | 6.224 |
| Carrot | 5 | 0% | 25 | 4.578 | 1548.000 | 4.578 | 0.261 | 5.654 |
| Carrot | 6 | 0% | 25 | 4.350 | 2064.281 | 4.350 | 0.159 | 5.372 |
| Carrot | 7 | 0% | 25 | 7.190 | 2018.881 | 7.904 | 0.377 | 9.761 |
| Carrot | 8 | 0% | 25 | 2.180 | 814.891 | 2.180 | 0.204 | 2.693 |

TABLE 5B

Tensile Tests at 33% R.H.

| Sample | Rep. | Relative Humidity | Temp (° C.) | Strength at Max Load (MPa) | Elastic Modulus (MPa) | Strength at Auto Break (MPa) | Elongation at Auto Break (%) | Load at Max Load (N) |
|---|---|---|---|---|---|---|---|---|
| Carrot | 1 | 33% | 22 | 12.436 | 849.416 | 12.436 | 1.804 | 15.359 |
| Carrot | 2 | 33% | 22 | 7.781 | 671.178 | 7.781 | 1.244 | 9.610 |
| Carrot | 3 | 33% | 22 | 8.926 | 710.010 | 8.926 | 1.404 | 11.024 |
| Carrot | 4 | 33% | 22 | 9.272 | 743.393 | 9.272 | 1.485 | 11.451 |
| Carrot | 5 | 33% | 22 | 11.080 | 696.067 | 11.080 | 1.960 | 13.684 |
| Carrot | 6 | 33% | 22 | 10.148 | 712.878 | 10.148 | 1.722 | 12.533 |
| Carrot | 7 | 33% | 22 | 9.845 | 653.580 | 9.845 | 1.849 | 12.159 |
| Carrot | 8 | 33% | 22 | 8.711 | 675.378 | 8.711 | 1.575 | 10.758 |

TABLE 5C

Tensile Tests at 75% R.H.

| Sample | Rep. | Relative Humidity | Temp (°C.) | Strength at Max Load (MPa) | Elastic Modulus (MPa) | Strength at Auto Break (MPa) | Elongation at Auto Break (%) | Load at Max Load (N) |
|---|---|---|---|---|---|---|---|---|
| Carrot | 1 | 75% | 22 | 4.427 | 46.135 | 4.427 | 20.632 | 5.467 |
| Carrot | 2 | 75% | 22 | 4.548 | 52.158 | 4.548 | 17.343 | 5.617 |
| Carrot | 3 | 75% | 22 | 3.999 | 50.162 | 3.999 | 15.797 | 4.939 |
| Carrot | 4 | 75% | 22 | 3.984 | 51.392 | 3.984 | 15.340 | 4.921 |
| Carrot | 5 | 75% | 22 | 3.017 | 58.830 | 3.017 | 10.801 | 3.726 |
| Carrot | 6 | 75% | 22 | 4.389 | 63.484 | 4.389 | 14.412 | 5.420 |
| Carrot | 7 | 75% | 22 | 4.743 | 66.582 | 4.743 | 16.467 | 5.858 |
| Carrot | 8 | 75% | 22 | 5.359 | 76.577 | 5.359 | 16.415 | 6.618 |

TABLE 6A

Tomato films at 0% Relative Humidity

| | Sample (Thickness) (mm) | R.H. % | Strength at Max Load (MPa) | Elastic Modulus (MPa) | Strength at Auto Break (MPa) | Elongation at Auto Break (%) | Load at Max Load (N) |
|---|---|---|---|---|---|---|---|
| 1 | Tomato (0.130) | 0% | 3.542 | 966.316 | 3.542 | 0.331 | 5.987 |
| 2 | Tomato (0.139) | 0% | 3.613 | 428.827 | 3.613 | 0.590 | 6.529 |
| 3 | Tomato (0.137) | 0% | 6.281 | 1075.325 | 6.281 | 0.756 | 11.186 |
| 4 | Tomato (0.131) | 0% | 8.475 | 1117.833 | 8.475 | 0.973 | 14.432 |
| 5 | Tomato (0.129) | 0% | 3.934 | 741.717 | 3.934 | 0.460 | 6.598 |
| 6 | Tomato (0.129) | 0% | 5.023 | 935.58 | 5.023 | 0.470 | 8.423 |

TABLE 6B

Tomato films at 33% Relative Humidity

| | Sample (Thickness) (mm) | R.H. % | Strength at Max Load (MPa) | Elastic Modulus (MPa) | Strength at Auto Break (MPa) | Elongation at Auto Break (%) | Load at Max Load |
|---|---|---|---|---|---|---|---|
| 1 | Tomato (0.115) | 33% | 9.026 | 170.361 | 9.026 | 10.309 | 13.495 |
| 2 | Tomato (0.115) | 33% | 9.643 | 198.589 | 9.643 | 10.236 | 14.040 |
| 3 | Tomato (0.125) | 33% | 7.786 | 201.345 | 7.786 | 9.020 | 12.653 |
| 4 | Tomato (0.124) | 33% | 8.106 | 166.911 | 8.106 | 11.091 | 13.067 |

TABLE 6C

Tomato films at 75% Relative Humidity

| | Sample (Thickness) (mm) | R.H. % | Strength at Max Load (MPa) | Elastic Modulus (MPa) | Strength at Auto Break (MPa) | Elongation at Auto Break (%) | Load at Max Load (N) |
|---|---|---|---|---|---|---|---|
| 1 | Tomato (0.125) | 75% | 2.692 | 38.484 | 2.021 | 30.695 | 4.374 |
| 2 | Tomato (0.143) | 75% | 2.282 | 27.411 | 1.810 | 29.019 | 4.242 |
| 3 | Tomato (0.135) | 75% | 2.836 | 27.857 | 1.397 | 31.325 | 4.977 |
| 4 | Tomato (0.122) | 75% | 2.827 | 28.640 | 2.569 | 32.599 | 4.484 |
| 5 | Tomato (0.135) | 75% | 2.603 | 29.786 | 1.607 | 32.580 | 4.569 |
| 6 | Tomato (0.115) | 75% | 3.271 | 34.492 | 2.861 | 33.065 | 4.891 |
| 7 | Tomato (0.121) | 75% | 3.300 | 34.119 | 2.142 | 31.646 | 5.190 |

Example 2

The following example describes preparation of products of the invention of products of the invention similar to onigiri wherein rice was wrapped with the films of the invention.

Materials and Methods

The carrot, tomato, and broccoli bilayer films were prepared in accordance with the formulation as described above for Example 1 with the exception that the carrot film had 25 grams of ginger per 25 lbs of formulation.

The rice was washed, rinsed, and cooked, and the cooked rice was formulated with additional fruits or spices. Rice for carrot ginger film had raisins, pineapple and small flakes of carrot ginger film for color. Rice for the tomato film was favored with basil and garlic.

The rice formulation is show in Tables 7 and 8.

TABLE 7

| Carrot-Ginger | Weight | Percentage |
|---|---|---|
| Rice wt. | 84 | 70% |
| Pineapple wt. | 24 | 20% |
| Raisin wt. | 12 | 10% |
| Carrot ginger films flecks wt. | 1.2 | 1% |
| Total Weight | 120 g. | |

TABLE 8

| Tomato-Basil | Weight |
|---|---|
| Rice wt. | 120 |
| Basil leaves | 0.5 |
| Garlic | 0.25 |
| Total Weight | 120 g. |

The dry film of the invention was first packaged inside a plastic wrap similar to an onigiri/rice ball wrap used for nori, and the plastic-packaged film of the invention was wrapped around the rice. In this way, the film retained its dry, crisp properties until the rice was consumed. When the plastic wrap was removed from the film, the flexible films of the invention formed around the rice for consumption by the consumer.

Example 3

The following example describes preparation of a combination fruit and vegetable monolayer film of the invention.

A total solution weight of 120 grams was prepared as follows. Twenty-eight grams spinach puree and 9 grams peach puree were combined with 83 grams water and homogenized using a Polytron homogenizer. The percent of the combination of fruit and vegetable purees in the wet film formulation calculated on a percent solids basis was 100%. Fifty grams of this solution were poured into a 5-inch diameter Teflon® mold, and dried overnight in a humidity controlled dryer. The resulting film had a weight of 2.6 grams, average thickness of 6.0 mils, and water activity of 0.469 at 22.3° C.

It is understood that the foregoing detailed description is given merely by way of illustration and that modification and variations may be made within, without departing from the spirit and scope of the invention. All publications and patents cited herein are hereby incorporated by reference in their entirety.

What is claimed is:

1. An edible film having the strength and flexibility to serve as a food wrap, the film comprising a fruit, vegetable or a combination fruit and vegetable layer, wherein the layer has at least 75% fruit, vegetable or combination of fruit and vegetable puree calculated on a percent solids basis; and wherein the film a moisture content in the range of about 4 to about 8%, and a water activity in the range of about 0.2 to about 0.6; and wherein the edible film comprises less than about 25% added ingredients calculated on a percent solids basis, wherein the added ingredients comprise one or more plasticizer source, edible polymer, edible insoluble fiber source, or mixtures thereof.

2. The edible film of claim 1, which has a dry film thickness in a range that is between about 4 to about 7 mils (about 0.1 to about 0.18 mm).

3. The edible film of claim 1, wherein the edible film is a bilayer film comprising (1) the fruit, vegetable or combination fruit and vegetable layer, and (2) an edible polymer layer.

4. The edible film of claim 1, wherein the edible film is monolayer film.

5. The edible film of claim 1, wherein the edible film is a multilayer film comprising (a) the fruit, vegetable or combination fruit and vegetable layer; (b) an edible polymer layer and (c) one or more additional fruit, vegetable or combination fruit and vegetable layers; edible polymer layers, or combinations thereof.

6. The edible film of claim 1, wherein the fruit, vegetable or a combination fruit and vegetable layer comprises green tea.

7. A food product comprising a food, food component, or food ingredient in combination with the edible film of claim 1.

8. The food product of claim 7, wherein the film is wrapped around, applied between or applied to the food, food component or food ingredient.

9. The food product of claim 7, wherein the food, food component or food ingredient is selected from the group consisting of rice, couscous, tofu, potatoes, noodles, fish, meat, beans, nuts, oatmeal, cheese, vegetables, fruit, eggs, polenta, bread, and gelled matrixes such as gelatin gels or a combination thereof.

10. The food product of claim 7, wherein the edible film is a bilayer film, monolayer film or multilayer film.

11. The food product of claim 7, which has been packaged so as to maintain the moisture content of the edible film.

12. The edible film of claim 1 further comprising a flavor ingredient, flavor enhancer, color source, or color enhancer.

13. A method of preparing an edible film having the strength and flexibility to serve as a food wrap, the film, wherein the edible film comprises a fruit, vegetable or a combination fruit and vegetable layer, the method comprising:

(a) preparing a wet cast formulation by mixing an edible plasticizer, an edible polymer, an edible insoluble fiber source or a mixture thereof with a fruit, vegetable or combination of fruit and vegetable puree such that the wet cast formulation comprises at least 75% fruit, vegetable or combination of fruit and vegetable puree and less than about 25% added plasticizer, added edible polymer, added insoluble fiber, or mixture thereof, calculated on a percent solids basis, (b) casting a film to produce a cast film, and (c) drying the cast film to produce a dried film having a moisture content in a range that is between about 4% to about 8%, and a water activity in a range that is between about 0.2 to about 0.6, thereby producing an edible film that has the strength and flexibility to serve as a food wrap.

* * * * *